United States Patent [19]

Chattha et al.

[11] Patent Number: 4,992,405
[45] Date of Patent: Feb. 12, 1991

[54] THREE-WAY CATALYST FOR AUTOMOTIVE EMISSION CONTROL AND METHOD OF MAKING THE CATALYST

[75] Inventors: Mohinder S. Chattha, Northville, Mich.; William L. H. Watkins, Toledo, Ohio; Haren S. Gandhi, Farmington Hills, Mich.

[73] Assignee: Ford Motor Company, Dearborn, Mich.

[21] Appl. No.: 440,526

[22] Filed: Nov. 22, 1989

[51] Int. Cl.$^5$ .................... B01J 21/06; B01J 23/10; B01J 23/44; B01J 23/46
[52] U.S. Cl. ................... 502/303; 423/213.5
[58] Field of Search ................ 502/303; 423/213.5

[56] References Cited

U.S. PATENT DOCUMENTS

| | | | |
|---|---|---|---|
| 4,123,391 | 10/1978 | Noguchi et al. | 252/466 A |
| 4,283,308 | 8/1981 | Ohara et al. | 252/435 |
| 4,350,613 | 9/1982 | Nishino et al. | 252/455 R |
| 4,504,598 | 3/1985 | Ono et al. | 502/303 |
| 4,624,941 | 11/1986 | Berndt et al. | 502/302 |
| 4,650,782 | 3/1987 | Onal | 502/339 |
| 4,675,308 | 6/1987 | Wan et al. | 502/304 |
| 4,791,091 | 12/1988 | Bricker et al. | 502/303 |
| 4,868,148 | 9/1989 | Henk et al. | 502/326 X |

*Primary Examiner*—W. J. Shine
*Attorney, Agent, or Firm*—Joseph W. Malleck; Roger L. May

[57] ABSTRACT

A three-way catalyst construction, including its method of making, which deploys palladium and rhodium as precious metal catalysts, and lanthanum oxide and titania as a nonprecious metal catalyst, in a unique combination and in a unique manner. The three-way catalyst construction for automotive emission control, such catalyst being applied to a mechanical carrier having a support comprised substantially of alumina, comprises: (a) a discontinuous lanthanum oxide coating on the support; (b) a catalytic precious metal compound of palladium and rhodium, where rhodium is no greater than 10% by proportion of the palladium with palladium being at least 60% by weight of the precious metal catalyst, said precious metal catalyst being discontinuously supported on the decorated support; and (c) a nonprecious metal catalytic compound of titanium oxide disposed discontinuously on or about said precious metal catalyst compound and lanthana.

14 Claims, 9 Drawing Sheets

THREE-WAY CATALYST FOR AUTOMOTIVE EMISSION CONTROL AND METHOD OF MAKING THE CATALYST

BACKGROUND OF THE INVENTION

1. Technical Field

This invention relates to the art of making catalytic composites for treating automotive emissions, and more particularly to three-way catalyst compositions that have high conversion efficiency for hydrocarbons, carbon monoxide, and nitrogen oxides.

2. Discussion of the Prior Art

Precious metals, including palladium and rhodium, have been used as active catalyst materials in automotive emission devices. However, palladium by itself as the dominant or sole catalyst material is limited in its effectiveness to promote the reduction of nitrogen oxide compounds at high temperatures and is not optimum in promoting oxidation of hydrocarbons at such temperatures. An example of such palladium usage is disclosed in U.S. Pat. No. 4,123,391. A variety of cost-increasing alternatives have been used to augment the capabilities of palladium, primarily by the use of other precious metals, particularly rhodium. Rhodium has been deployed with platinum, or with platinum and palladium, because rhodium is selective in the reduction of nitrogen oxides by carbon monoxide into innocuous nitrogen in the presence of excess air in the air to fuel ratio (A/F) supplied to the catalyst. The presence of excess oxygen in the exhaust will be hereinafter referred to as "lean exhaust" and encompasses a lambda of 1.1–8.0. Platinum is readily sintered at elevated temperatures in a lean exhaust atmosphere, thus reducing available surface area of a catalyst. Lean exhaust conditions also have a detrimental effect upon the rhodium because it interacts with gamma alumina and diffuses thereinto and thus results in a reduction in activity, probably due to a loss of rhodium accessibility to the exhaust system (see U.S. Pat. No. 4,675,308).

This invention has discovered that the addition in a unique manner of small amounts of titania and rhodium to a palladium/lanthana catalyst will synergistically enhance the total catalytic effect for oxidation and reduction, particularly under lean exhaust conditions. Titania has not been used heretofore as a catalyst enhancing ingredient nor has titania and lanthanum oxide been used together as catalyst enhancing ingredients. Titania has been incorporated heretofore in catalyst support materials for purposes of stabilizing such support materials, but prevented from entering into the catalytic process by coverings of other catalytically active ingredients (see U.S. Pat. Nos. 4,504,598 and 4,123,391). In some cases, titania has been layered on the support in large amounts prior to being covered with a catalytically active material (see U.S. Pat. No. 4,350,613). Straight titania has been slurried onto prevalent precious metal materials, including palladium, in a continuous film (of about 0.003–0.01 inches) to make an oxidation catalyst more lead-tolerant (see U.S. Pat. No. 4,650,782). Such catalyst construction was not intended for enhancement of reduction processes, the titania did not function as a reducing catalyst, and there was found no special catalytic synergism between titania and palladium.

Lanthanum oxide has been suggested for use as a substrate stabilizer as well as other rare earth oxides (see U.S. Pat. Nos. 4,624,941 and 4,283,308). In such disclosures, lanthanum oxide is dispersed as a sintered powder onto a substrate support such as alumina; the lanthanum oxide and support together are then covered with one or more noble metals. No improvement in catalytic activity was attributed to the presence of lanthanum oxide. U.S. Pat. No. 4,791,091 found that dispersing lanthanum oxide onto alumina in small particle size allowed less interference with the activity of the precious metal when compared to dispersing lanthanum oxide in larger particle sizes, but failed to appreciate how lanthanum oxide could effect a synergistic improvement between a precious metal and a nonprecious metal catalyst.

SUMMARY OF THE INVENTION

This invention is a three-way catalyst construction, including its method of making, which deploys palladium and rhodium as precious metal catalysts, and lanthanum oxide and titania as nonprecious metal catalysts, in a unique combination and in a unique manner. The three-way catalyst construction for automotive emission control, such catalyst being applied to a mechanical carrier having a support comprised substantially of alumina, comprises: (a) a discontinuous lanthanum oxide coating on the support; (b) a catalytic precious metal compound of palladium and rhodium, where rhodium is no greater than 10% by proportion of the palladium with palladium being at least 60% by weight of the precious metal catalyst, said precious metal catalyst being discontinuously supported on the decorated support; and (c) a nonprecious metal catalytic compound of titanium oxide disposed discontinuously on or about said precious metal catalyst compound and lanthana.

The unique coaction between the discontinuous crystallite deposits of titania and $Pd+La_2O_3$ leads to improved conversion efficiencies at lean exhaust gases as well as at lower and higher end conversion temperatures.

"Support" is used herein to mean a material having a high surface area per unit volume and a good adhesion for precious metal applied thereto; "carrier" is used herein to mean a material having a low surface area per unit volume and a poor adhesion to precious metals if applied thereto; "catalyst" or "catalyst construction" is used herein to mean the aggregation of support, lanthana, precious metal catalytic compounds and titania, but excluding the carrier.

Preferably, alumina particles are precipitated from an alumina slurry, and such particles should be present in the catalyst construction in an amount of at least 50% by weight. Lanthana is preferably precipitated from lanthanum nitrate and the lanthana should be present in the catalyst in an amount of 2–30% by weight. Preferably, palladium is precipitated from palladium nitrate and is present in an amount of 0.05–5% of the total weight of the catalyst, and rhodium is deposited in an amount of 0.08–1.5% by weight of the catalyst. The discontinuous titania phase is formed from an organo-titanate and the titania constitutes up to 8% of the total weight of the catalyst, no greater than 40% of the surface area of each exposed particle of precious metal catalytic compound being covered by the discontinuous phase of titanium oxide.

The method of this invention comprises: (a) discontinuously coating an alumina support with lanthana; (b) impregnating the coated support with a precious metal compound, a major constituent of which is palladium and a minor constituent is rhodium, to form a discontinuous phase on the lanthana and support; and (c) impregnating the coating support and precious metal catalytic compound with an organo-titanium compound to form, upon heating, a discontinuous titania phase on the discontinuous lanthana and precious metal compound phases. Discontinuity of lanthana is achieved by precipitation of a crystalline compound from an inorganic solution, which crystalline compound inherently fails to continuously spread across the alumina. Maximum dispersement on the alumina is achieved up to 15% by weight lanthanum oxide.

DETAILED DESCRIPTION AND BEST MODE

The three-way catalyst of this invention is designed for use on a mechanical carrier and consists essentially of: (a) a support comprised substantially of alumina; (b) a discontinuously decorated lanthanum oxide on said support; (c) palladium supported discontinuously on the lanthanum oxide decorated support; (d) a discontinuous phase of titanium oxide superimposed on said palladium/lanthana decorated support; and (e) rhodium supported discontinuously on said titania, palladium/lanthana decorated support, said rhodium being present in an amount no greater than 10% by weight of said palladium.

The mechanical carrier is preferably comprised of a monolithic silicate structure (i.e., cordierite) although the configuration of which is not critical to the catalyst of this invention. The volume of the structure is measured by its exterior dimensions. It is preferred that the micropore volume of the silicate material be relatively low and the macropore volume provide at least about 90% with pore diameters greater than 2000 angstroms. The surface area of the carrier, as opposed to the material of which the structure is made, should be maximized consistent with pressure drop limitations for the particular application of the catalytic system of this invention. It is preferred that the surface area of the monolithic structure provide 50-1000 m² per liter of structure, as measured by $N_2$ adsorption. Cell density should be maximized consistent with pressure drop limitations and is preferably in the range of 200-800 cells per square inch of cross-sectional area of the structure.

Alumina must be the dominant or substantial ingredient of the support (at least 50% by weight) because it has high surface area, good adhesion, and low precious metal-support interaction. It is desirable to form a support slurry by adding a solution of lanthanum nitrate in water to alumina particles, gamma or alpha type. Lanthanum oxide decorated alumina particles are formed upon drying (12 hours at 110° C.) and calcination (at about 700° C. for 16 hours) from such slurry. The crystalline lanthana will not form a continuous coating, but rather will form pockets of separated particles or patches of lanthana.

The particles of such drying and calcination will then receive the discontinuous phases of palladium, titania, and rhodium to form a collection of specially decorated particles which are eventually applied as a washcoating to the carrier or monolithic structure heretofore described.

Figure 1:
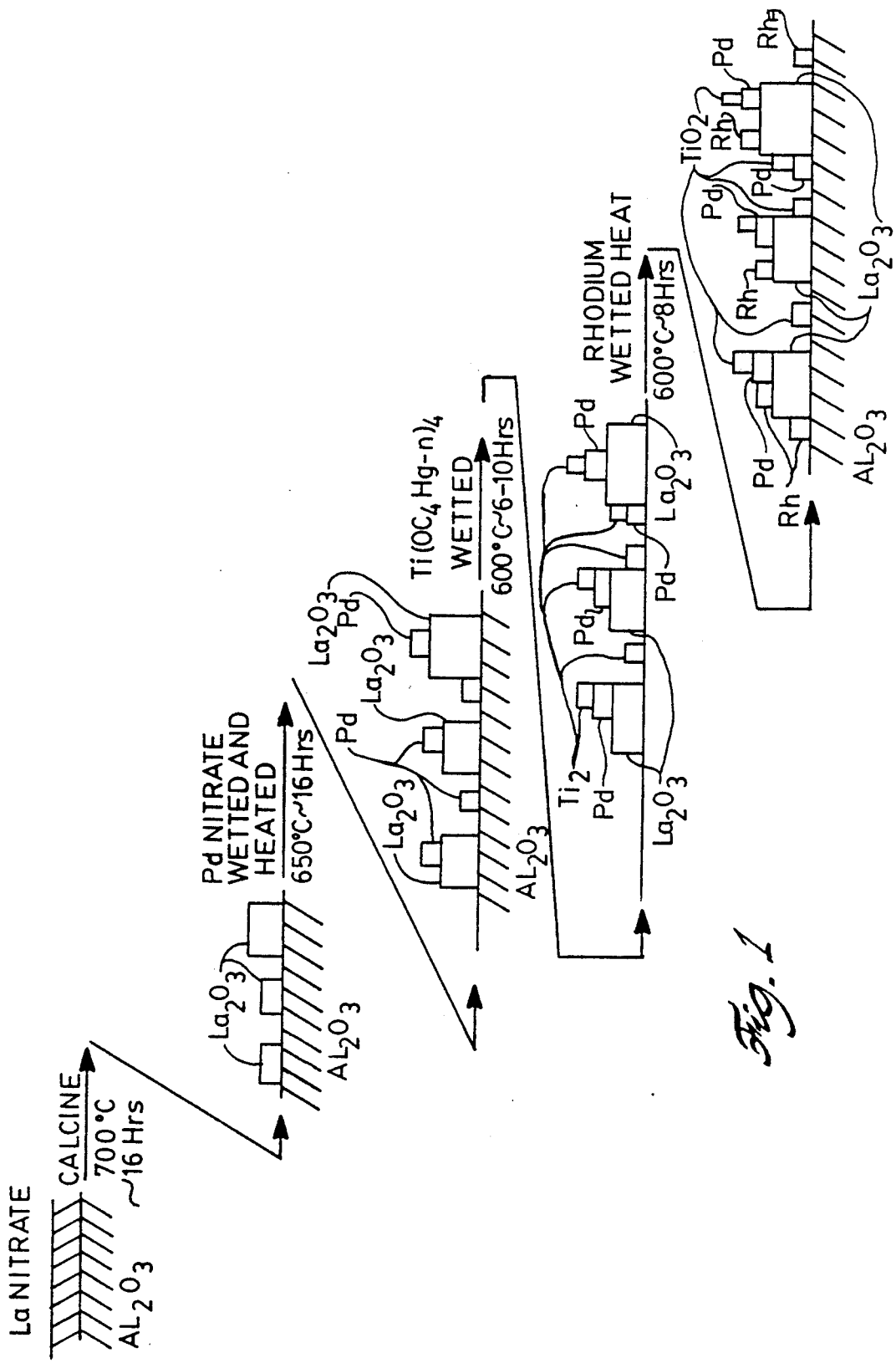
FIG. 1 is a schematic illustration of the lanthana, rhodium, palladium, and titania crystallites and deposit relationship.

The palladium is applied by forming a diluted solution of palladium nitrate (containing about 0.5 grams/liter of palladium) and adding to such solution the lanthana decorated alumina particles; the mixture is dried (for about 12 hours at about 110° C.) and calcined (for about 16 hours at about 650° C.) to produce discontinuously decorated palladium/lanthana/alumina composition. This is represented in FIG. 1 as the second stage. The palladium is impregnated by use of a diluted palladium nitrate solution, with the amount of acid in such solution being regulated to a pH of 3-5, to provide incipient wetness; after drying the wetted support with the acid solution, the composite is calcined at a temperature in the range of 450°-650° C.

This composition is then impregnated with titanium butoxide dissolved in ethanol, dried at about 100° C. for about 12 hours and then stage-heated to be calcined.

This latter material is then impregnated with up to 0.15% and no less than 0.08% (preferably about 0.1%) rhodium by wetting the composition to "incipient wetness" with a rhodium nitrate solution. The material is then dried for about 12 hours at 100° C. and calcined at 600° C. for about six hours.

The decomposition products of heat treating each of the catalytic additives is shown in FIG. 1 to depict the crystallite relationships. Lanthana nitrate wetted alumina particles are calcined for about 16 hours at 700° C. to produce separated crystallites of lanthanum oxide. Palladium nitrate wetted lanthana/alumina is then heated in air to form separated crystallites of palladium on or about the lanthana and alumina. Wetting the discontinuous crystallites of lanthana and Pd with an organo-titanium compound, and then heating, results in growing of $TiO_2$ on or adjacent to the Pd particles which in turn have been grown on or adjacent to the lanthana crystallites. Rhodium is then wetted thereonto, which rhodium and crystallites are formed discontinuously on or about as a result of heating. Irregularities in the gamma alumina substrate, such as exposed crystallographic planes, contamination layers, or roughness due to geometry of nucleation sites, decrease the interfacial strength between Pd and gamma alumina and promote even greater discontinuities of the Pd particles.

The resulting specially decorated rhodium/titania/palladium/lanthana/alumina particles can be deposited on the monolithic carrier by any conventional or convenient means. Typical of such means is dipping the carrier in a slurry of such specially decorated particles to form a deposit in the form of a film of about 0.0003-0.01 inches thick. It is also preferred that such deposited particles be present on the monolithic support in an amount ranging from about 400 to about 10,000 grams per cubic foot of carrier, where the volume is measured by the exterior dimensions of the monolithic carrier.

Alternatively, the discontinuous phases may be applied directly to an alumina coated monolith structure as a first coating and the discontinuous phase of titanium oxide and rhodium applied over the palladium.

Palladium must be present in the catalyst in an amount of at least 55% by weight of the precious metals added thereto. Platinum may be present in such precious metal material up to an amount of 45%.

The discontinuous titania phase consists of $TiO_2$ (the stable oxide form), but other forms such as $TiO$, $Ti_2O_3$, $Ti_3O_5$, and $Ti_2O$ may be present in minor proportions of less than 2%. Titania should constitute from 0.1-8% by weight of the catalyst, and preferably 0.1-2.0% of the total weight of such catalyst. Discontinuity of the titania phase means that the phase covers no greater than 40% and preferably 2-20% of the exposed surface of the palladium precious metal. If titania is present in an amount greater than 8% by weight, the titania phase starts to display continuous regions and conversion efficiency is seriously affected. If present in an amount less than 0.1% by weight, the ability of titania to supply oxygen to palladium is unnoticeable and thus again affects conversion efficiency. Incipient wetness is used herein to mean that most if not substantially all of the solution is adsorbed in the mixture with only a slight liquid film remaining.

Rhodium must be present in a very small amount in the range of 0.08-1.5% by weight of the catalyst, and should not be more than 10% of the weight amount of palladium present in the precious metal. Palladium should be present in the range of 0.05-5.0% by weight of the catalyst. If either of the palladium or rhodium contents fall below such minimum weight percentage, the ability to oxidize hydrocarbons and reduce nitrogen oxide will be detrimentally affected. If either of the palladium or rhodium contents exceed such maximum percentages, the precious metal cost becomes excessively expensive and at some percentage point the coatings will become too spread out or continuous, thereby detracting from the catalytic effectiveness of this invention.

The synergistic improvement in catalytic activity for this invention is believed to be due, firstly, to the ability of lanthana to provide additional hydrogen to afford greater reduction of nitrogen oxides, and, secondly, to the presence of titania which is a reducible oxide providing more efficient oxidation and reduction processes to affect both palladium and rhodium. The foregoing takes place even though both palladium and rhodium are present in amounts much lower than used by the prior art to achieve comparable catalytic efficiency.

The method of making the three-way catalyst of this invention comprises: (a) decorating an alumina support with lanthana; (b) solution impregnating the decorated support with palladium to form a discontinuous phase on the product of step (a); (c) impregnating the product of step (b) with an organo-titanium compound to form, upon heating, a discontinuous titanium oxide phase on the exposed portions of such product; and (d) impregnating the product of step (c) with rhodium by incipient wetness to form upon heating a discontinuous phase thereon.

To decorate the alumina support, it is impregnated with a solution of a lanthanum compound (e.g., lanthanum nitrate) then dried and calcined to crystallize out lanthana. The decorated support is then impregnated by addition of a palladium nitrate solution, which mixture is then dried and calcined to crystallize a discontinuous phase of palladium. The palladium is present in a controlled amount of 0.05-5.0% by weight of the catalyst.

The palladium impregnated lanthana alumina is then solution impregnated with titanium butoxide in an amount of about 0.56 grams of titanium butoxide dissolved in 15 ml of ethanol. The organo-titanium compound is selected from the group consisting of organo-titanate. A preferred example of such compound is butoxide characterized by $Ti(OC_4H_9-n)_4$. Equivalents to butoxide are titanium alkoxides. Organo-titanium compounds, particularly titanium butoxide, decompose at lower temperatures, substantially below the decomposition temperature of palladium nitrate. The organo-titanium compound is applied by dissolving such compound in a liquid for wetting the alumina/lanthana/palladium composite, the wetted composite being then calcined at a temperature of about 400°-600° C. for 4-12 hours. Preferably, the calcination is staged to include heating to 250°-280° C. for 1½ to 2½ hours, and thence heating to 400°-600° C. for 5-10 hours.

The amount of organo-titanium compound introduced to the catalyst must be in the operational range of 0.1-8% by weight of the total catalyst, and preferably 0.1-2.0%. If the titanium compound were to be less than 0.1% of the total catalyst, there would be an imperceptible amount of enhancement of the catalytic activity. If the titanium compound were exceed 8%, the catalytic activity of palladium and rhodium would be retarded by masking of a greater percentage of the palladium and thus reducing its exposure.

Rhodium is applied to the catalyst by wetting the decorated substrate with a rhodium nitrate solution in an amount of about 0.1%. The wetted material is heated at 100° C. for 120 hours and then at 600° C. for six hours to result in discontinuous crystallites of rhodium.

The titania compound functions as a catalyst in combination with palladium, rhodium and lanthana to aid in reduction as well as oxidation of the gases within the automotive emission. The titanium oxide, in its discontinuous configuration, functions during oxygen-lean conditions of the emission gas to form di-titanium trioxide and additional oxygen. This may be represented by the equation:

$$2TiO_2 \rightarrow 2Ti_2O_3 + \tfrac{1}{2}O_2.$$

During rich oxygen spikes of the emission gas, a reducing condition occurs where di-titanium trioxide combines with oxygen to form titanium dioxide represented by the formula:

$$Ti_2O_3 + \tfrac{1}{2}O_2 \rightarrow 2TiO_2.$$

To show the importance and uniqueness of the process and chemical content variations, examples were prepared and subjected to simulated exhaust gas emissions.

Sample 1, representing the preferred mode of this invention, was prepared by impregnating gamma alumina (in a particle size of 20-40 mesh) by incipient wetness with lanthanum nitrate solution to produce a lanthana/alumina composition (42.5 grams of gamma alumina was placed in a porcelain dish and a solution of 8.4 grams of lanthanum nitrate in 56 ml of water was added to it). It was dried overnight (12 hours) at 100° C. and calcined at 700° C. for 16 hours. For this example and for other examples having a discontinuous phase of palladium, 6 ml of palladium nitrate solution (83.5 g/l) was diluted to 56 ml to obtain a solution containing 0.5 gram of palladium. To the solution was added the lanthana decorated alumina particles and was thoroughly mixed. The mixture was dried and calcined similarly.

For this example, and for others employing a discontinuous titania phase, a solution of 0.56 grams of titanium butoxide was prepared in 15 ml of ethanol and 5 grams of the 15% lanthana/alumina composition was added to it. This latter mixture was stirred to mix thoroughly. It was placed in an oven at 100° C. and stirred occasionally to obtain a homogeneous mixture. The material was dried at 100° overnight. It was then heated at 280° for one hour and at 600° C. for six hours. For this example, and for other examples containing discontinuous phase of rhodium precious metal, 4 grams of the decorated particles were impregnated with 0.1% rhodium (0.3 ml, 0.013888 g/1 ml solution) by incipient wetness and were dried at 100° C. overnight. The material was then calcined at 600° C. for six hours.

This example, as well as the other examples of this disclosure were then subjected to a catalytic activity test by immersion in a synthetic emission gas to evaluate hydrocarbon and carbon monoxide oxidation and nitric oxide reduction. The flow reactor had a gas constituted of 1% $H_2$, 1000 ppm NO, and space velocity of 30 K $hr^{-1}$ for the $NO_x$ test, and 500 ppm $C_3H_8$, 2% $O_2$ at 30 K $hr^{-1}$ for the HC test.

Figure 2:
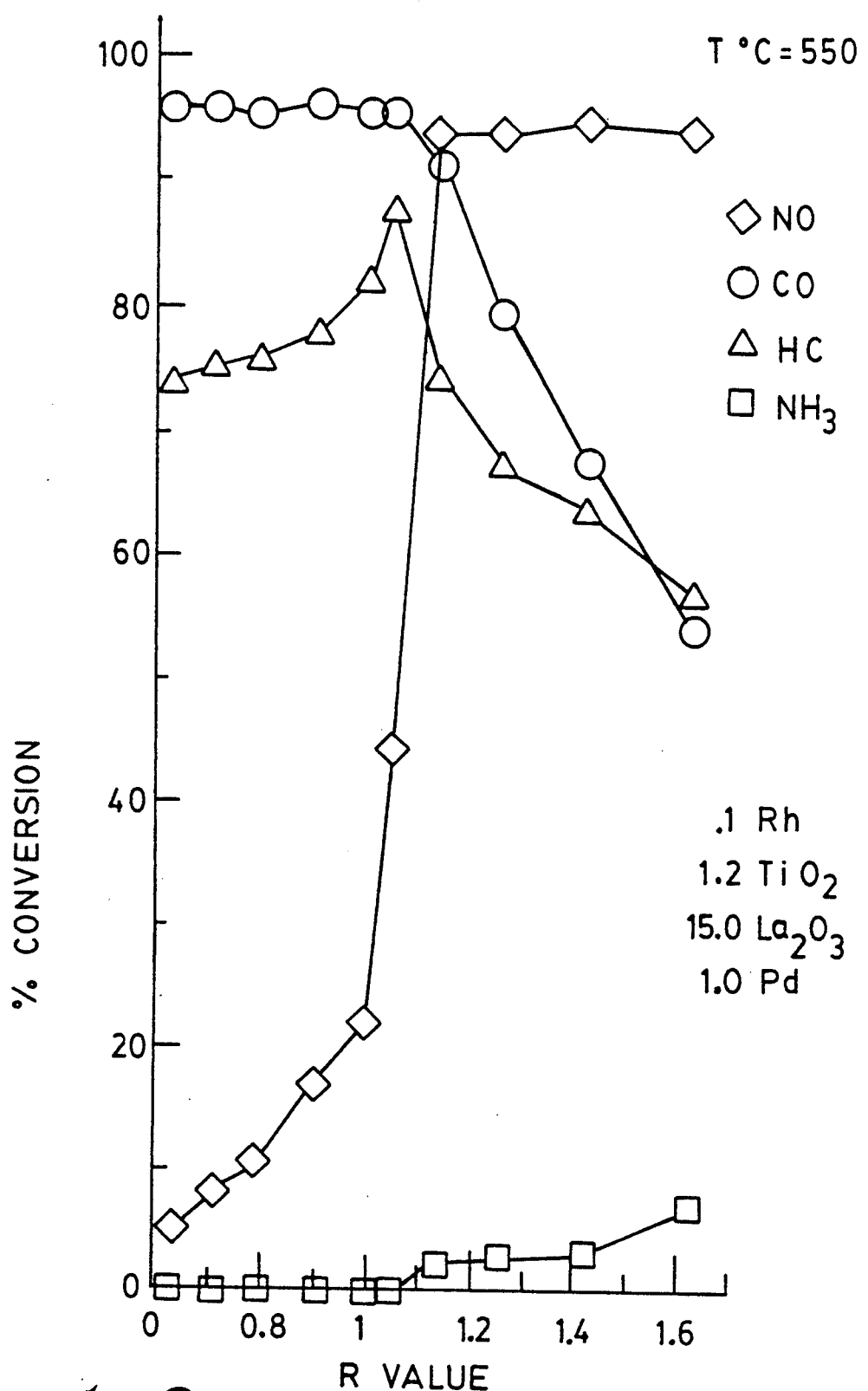
FIGS. 2-7 are graphical illustrations of the percent conversion efficiency as a function of lambda (indicator of A/F ratio) for different combinations of rhodium, titania, lanthana, and palladium contents.
Figure 3:
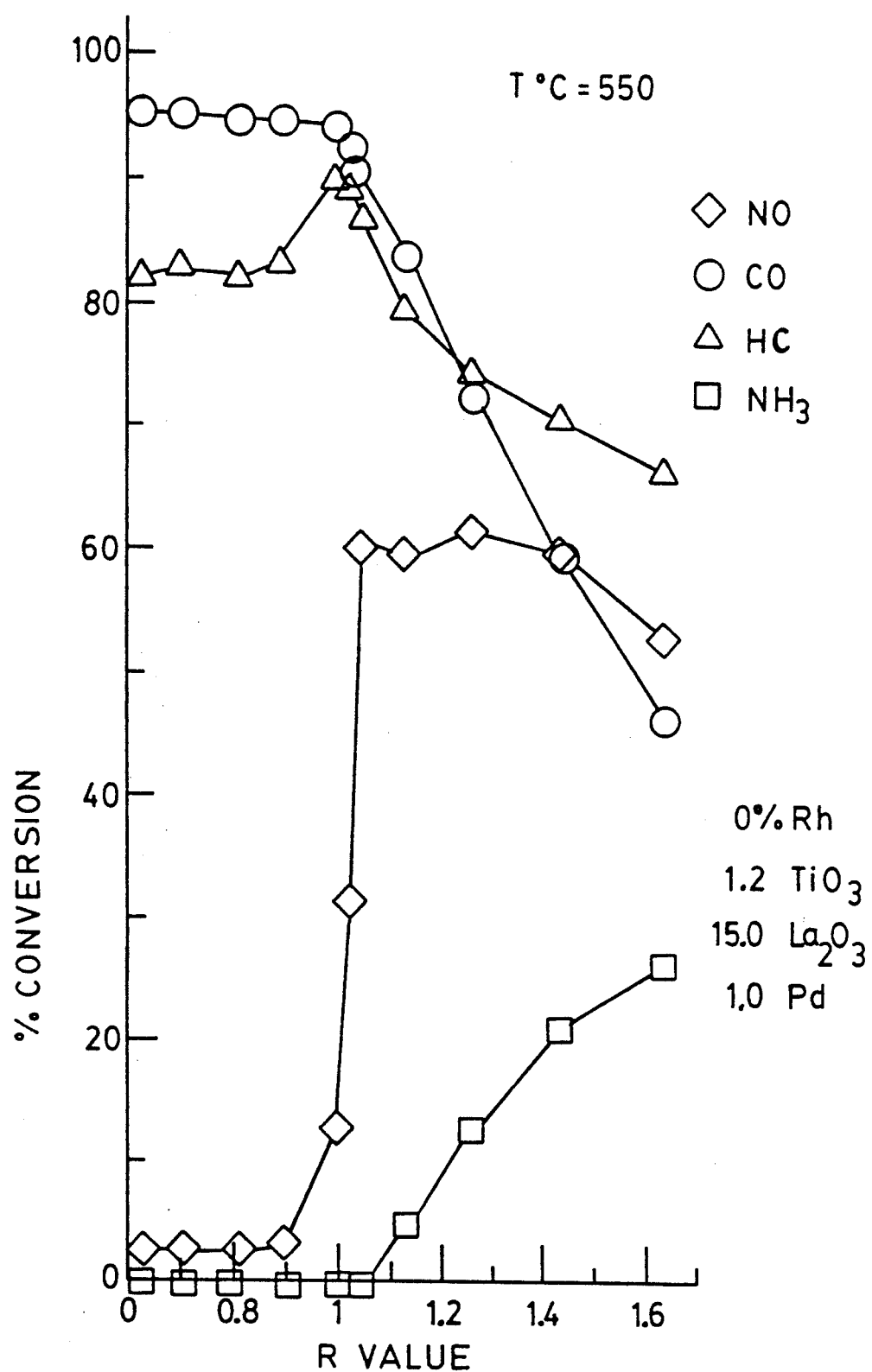

Sample 2 was prepared the same as sample 1, except that rhodium was deleted. As shown in FIG. 3, such example exhibited poor NO reduction, but comparable hydrocarbon and CO oxidation when compared to the results of FIG. 2 for the preferred embodiment. The ammonia production was increased considerably over that of the preferred embodiment.

Figure 4:
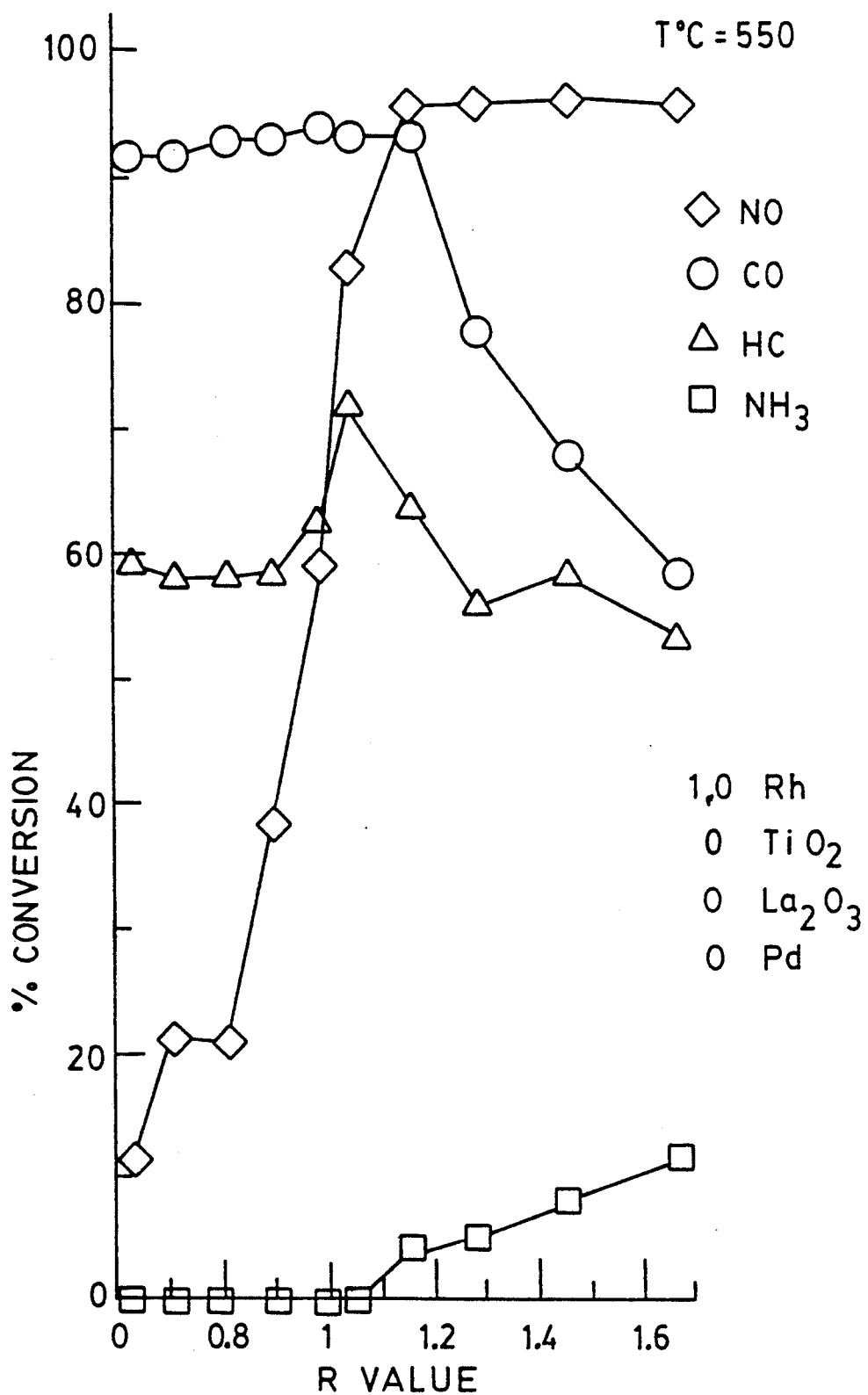

Sample 3 was prepared with heavy rhodium on alumina; the lanthana, palladium and titania were eliminated. As shown in FIG. 4, NO reduction was comparable to that obtained for the preferred embodiment of FIG. 2, but the hydrocarbon oxidation was considerably lower and the carbon monoxide oxidation was poorer at rich conditions. Ammonia production was increased over that of the preferred embodiment.

Figure 5:
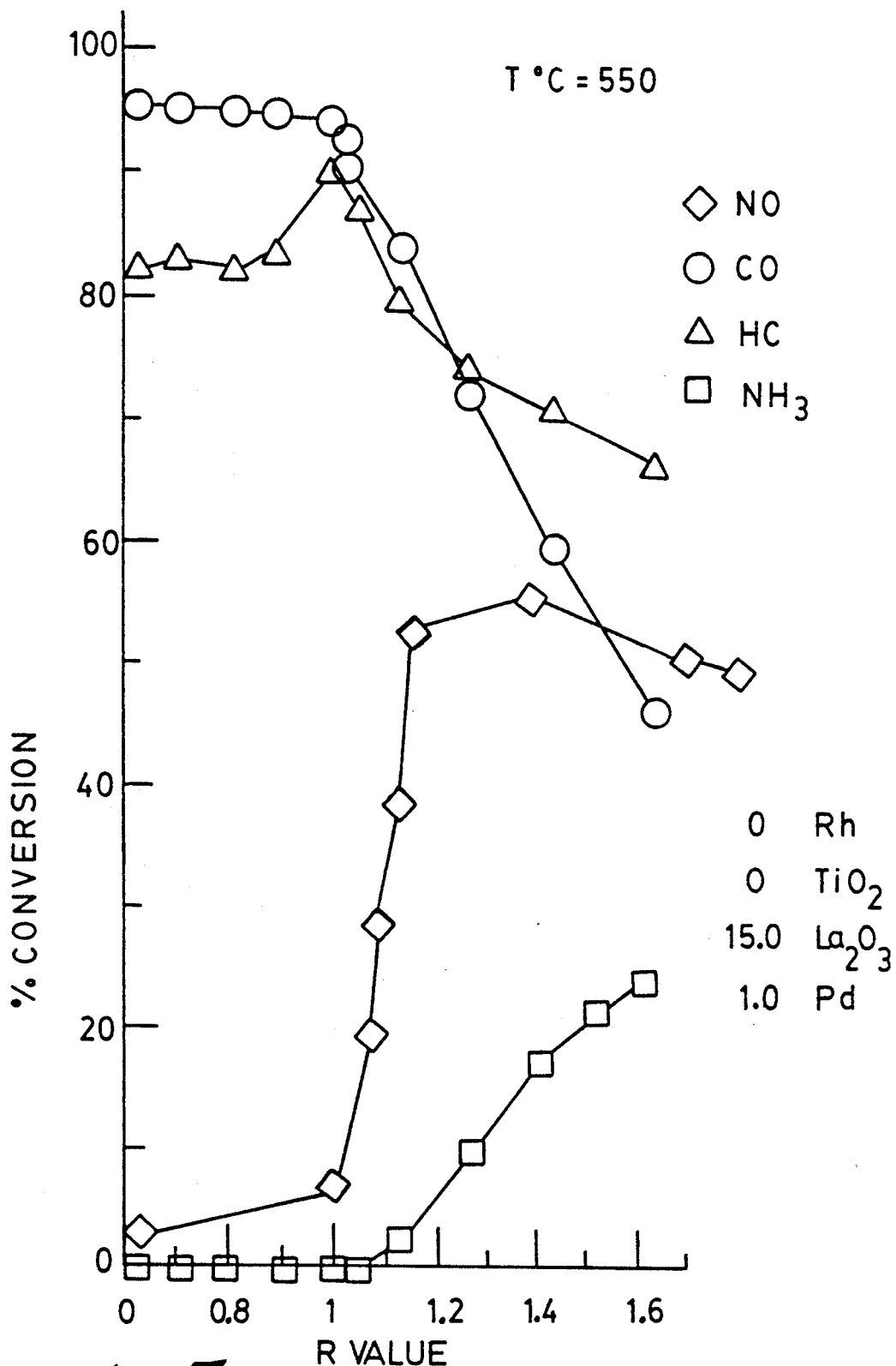
Figure 6:
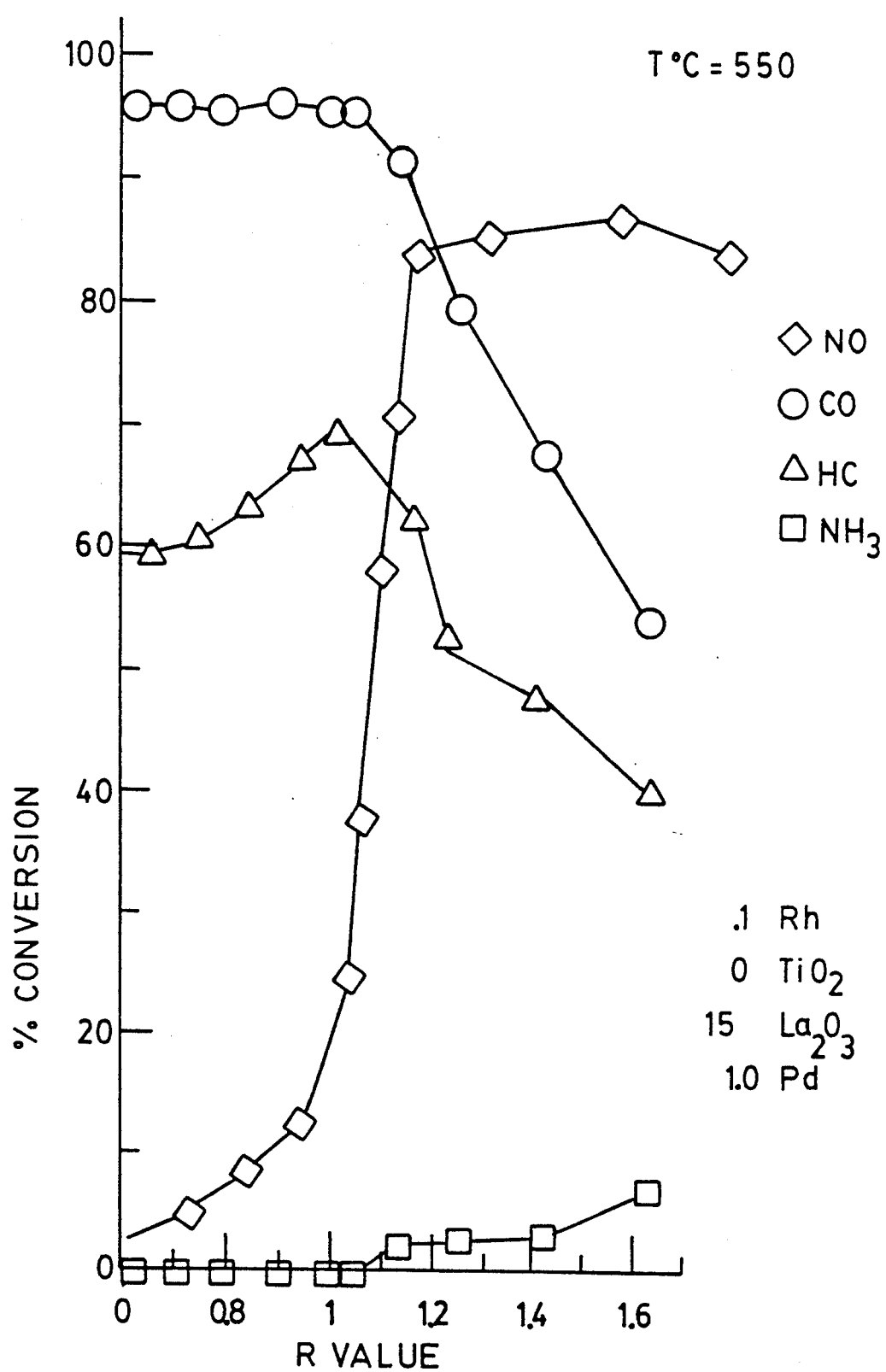

Sample 4 was prepared similar to the preferred embodiment with titania and rhodium absent; results, shown in FIG. 5, show poorer NO reduction than even FIG. 3 and still accompanied by increased ammonia production. Not only is the nitrogen oxide reduction considerably poorer because of the absence of rhodium, but the absence of titania contributes to an even lower capability for lean exhaust (lambda or A/F ratios greater than stoichiometric).

Figure 7:
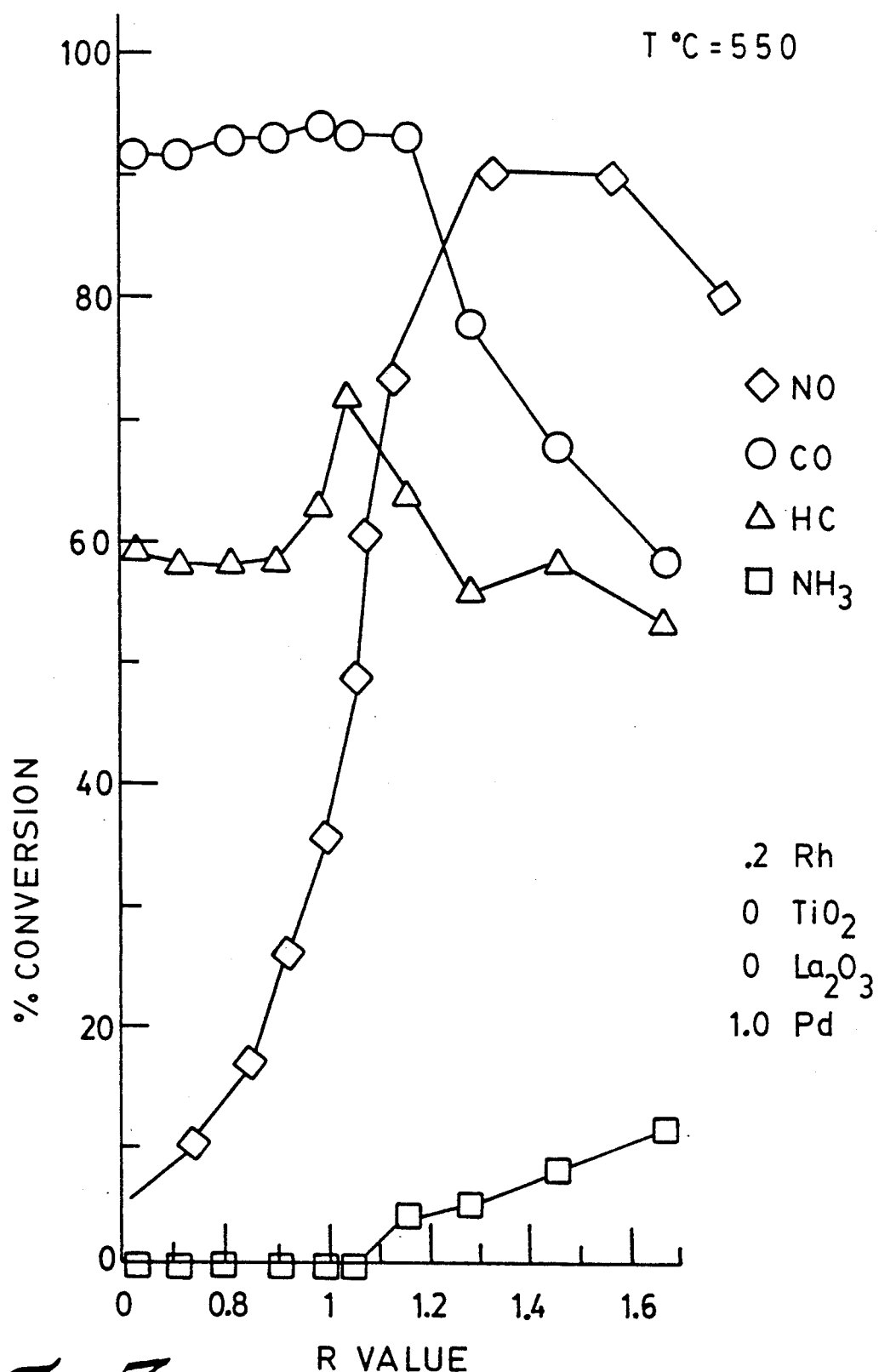

Sample 5 was prepared the same as sample 1, except that titania and lanthana were eliminated; such absence resulted in a diminution of the NO reduction, both at the rich as well as excess oxygen conditions, as shown in FIG. 7.

Figure 8:
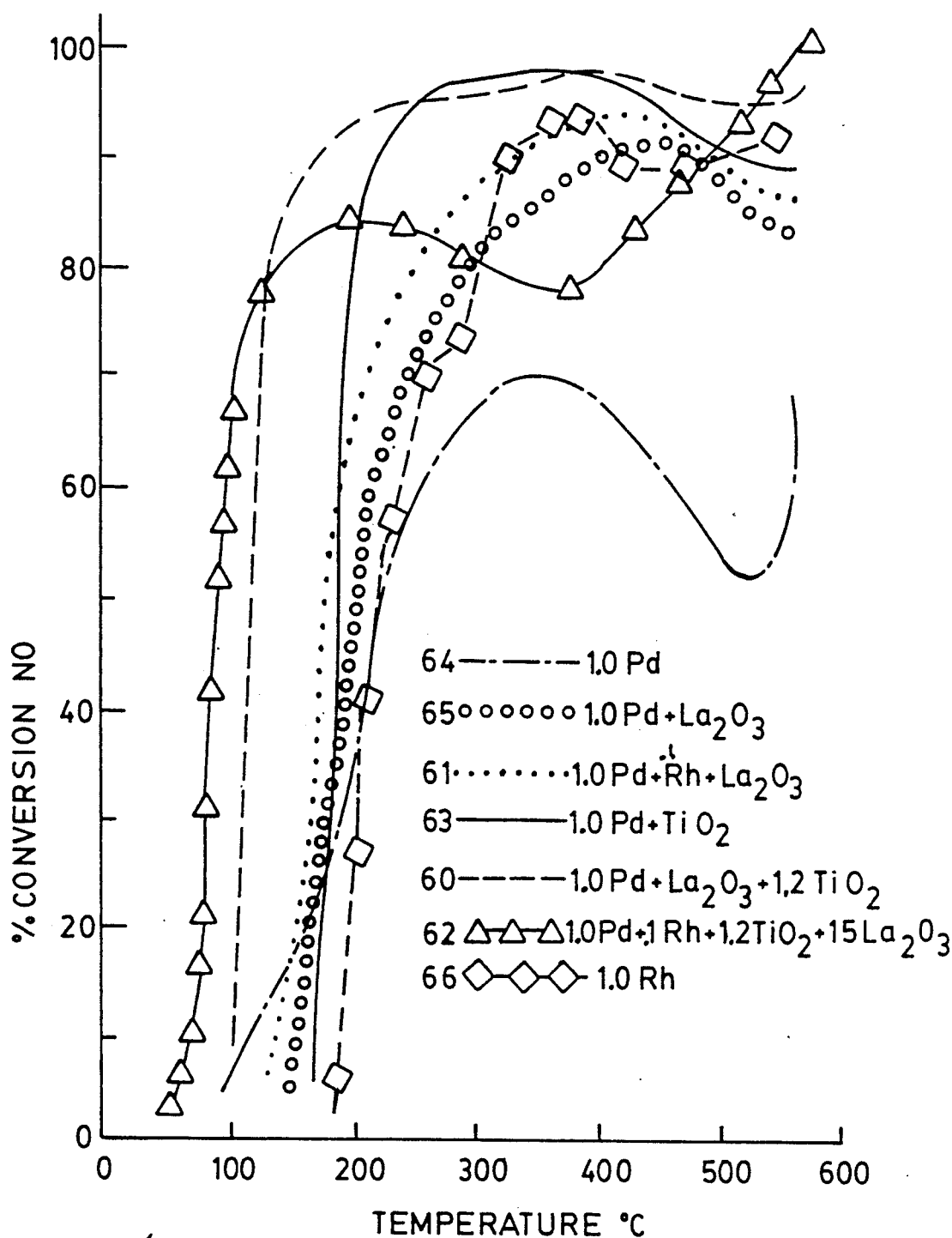
FIGS. 8-9 are graphical illustrations of the percent conversion efficiency as a function of gas emission temperatures for different combinations of rhodium, titania, lanthana, and palladium contents.
Figure 9:
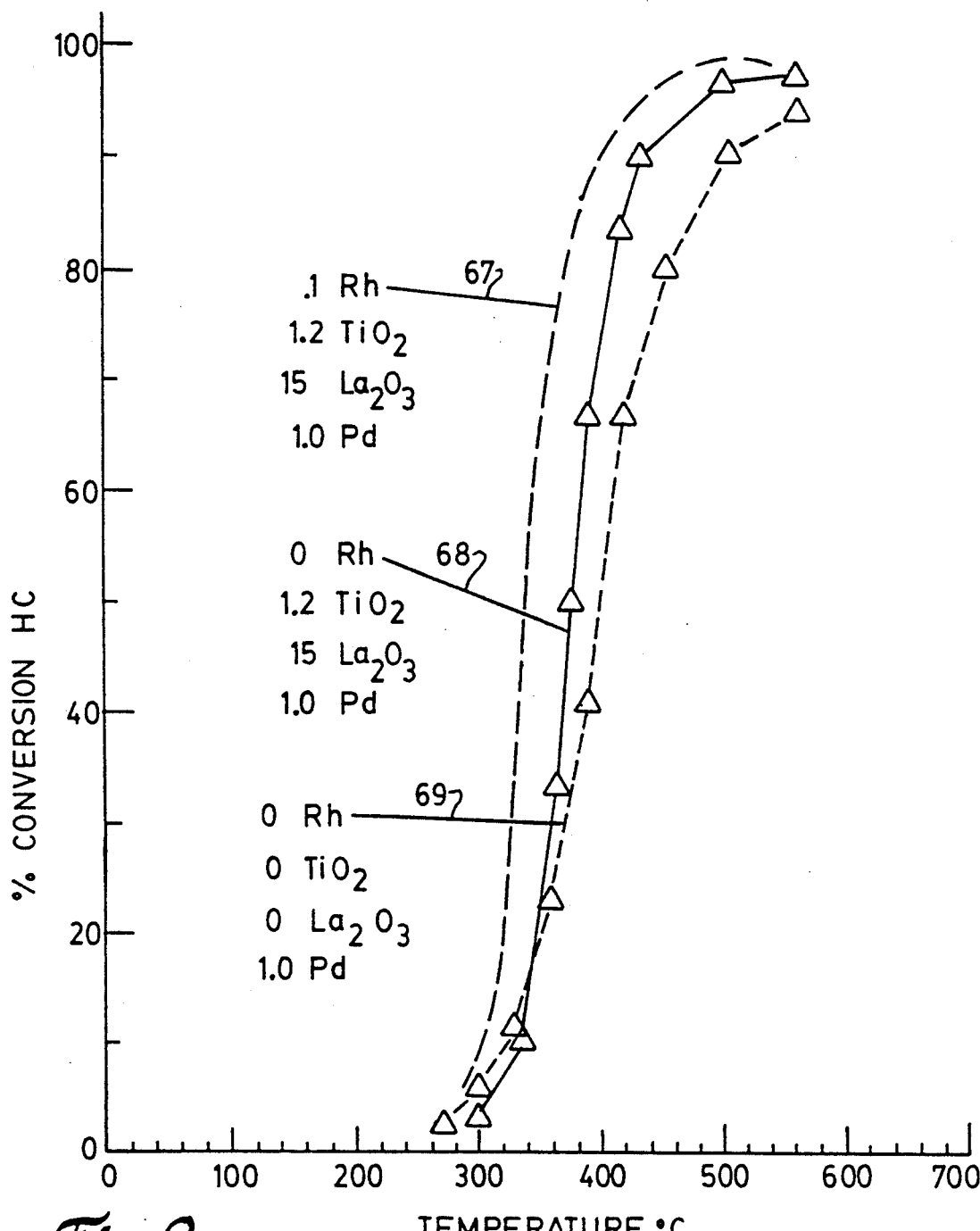

To illustrate the conversion efficiency of nitrogen oxide, as a function of conversion temperature, FIG. 8 shows the results of certain of the examples described above. From FIG. 8, it is clear that the absence of any titania or rhodium (curve 61 and 60 respectively) significantly detracts from the results of that obtained with the preferred embodiment as shown in curve 62. Absence of both titania and rhodium (curve 65) or the absence of lanthana (curve 63) shows other decreases in efficiency. Palladium (curve 64) or rhodium alone (curve 66) show poor oxidation or poor reduction characteristics, respectively. To illustrate the conversion efficiency of hydrocarbons, as a function of conversion temperature, FIG. 9 shows the results of certain of the examples described. The absence of rhodium and/or lanthanum (curve 68) is poorer in HC oxidation than that shown for curve 67 of the preferred embodiment. Curve 69, with titania, rhodium and lanthana absent, shows the poorest HC efficiency. As shown in FIGS. 2-8, the invention obtains a conversion efficiency of NO at 100° C. of at least 70% and hydrocarbon conversion efficiency at 350° C. of at least 30%. The invention also obtains a conversion efficiency of NO at lambda of 1.1 or greater of at least 94% and a hydrocarbon conversion efficiency at lambda of 1.4 of at least 60%. The production of ammonia at lambda at 1.6 is no greater than 3% in accordance with this invention.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of the invention.

What is claimed is:

1. A three-way catalyst for automotive emissions, the catalyst being applied to a mechanical carrier having a support comprised substantially of alumina, comprising:
   (a) discontinuous lanthanum oxide on said support;
   (b) catalytic precious metal of palladium and rhodium with rhodium being present in an amount no greater than 10% by weight of the precious metal and palladium constituting at least 60% by weight of the precious metal, the catalytic precious metal being discontinuously supported on or about said support; and
   (c) titania discontinuously residing on or about said catalytic precious metal and lanthana, said titania being present in an amount of 0.1-8.0% by weight of said catalyst.

2. A three-way catalyst for automotive emission control having a support comprised substantially of alumina, comprising:
   (a) discontinuous lanthanum oxide decoration on said support;
   (b) palladium supported discontinuously on the decorated support, said palladium being present in an amount of 0.05-5.0% by weight of the catalyst;
   (c) a discontinuous phase of titanium oxide superimposed on said palladium/lanthana decorated support, said titanium dioxide being present in an amount of 0.1-8.0% by weight of said catalyst; and
   (d) rhodium supported discontinuously on said titania/palladium/lanthana decorated support, said rhodium being present in an amount no greater than 10% by weight of said palladium.

3. The catalyst as in claim 2, characterized by a conversion efficiency of NO at 100° C. of at least 70% and a hydrocarbon conversion efficiency at 350° C. of at least 70%.

4. The catalyst as in claim 2, in which said discontinuous titania phase is 0.1-2.0% of the total weight of the catalyst.

5. The catalyst as in claim 1, in which said rhodium is present in the range of 0.08-1.5% by weight of the catalyst.

6. The catalyst as in claim 1, in which said titania is present in the range of 0.1-2.0% by weight of the catalyst.

7. The catalyst as in claim 1, in which said lanthana is present in an amount of 30% by weight of the catalyst.

8. The catalyst as in claim 1, characterized by a conversion efficiency of NO at lambda of 1.1 or greater of at least 94% and an HC conversion efficiency at lambda of 1.4 of at least 60%.

9. The catalyst as in claim 1, characterized by production of ammonia at lambda of 1.6 of no greater than 3%.

10. A method of making a three-way catalyst for automotive emissions control, comprising:
   (a) discontinuously coating lanthana on an alumina support;
   (b) impregnating the lanthana support with a palladium compound to form a discontinuous phase on the lanthana and support;
   (c) impregnating the palladium/lanthana support with an organo-titanium compound to form, upon heating, a discontinuous titanium oxide phase on the exposed portions of the discontinuous palladium/lanthana/alumina particles, said compound being used in an amount of 0.1-8.0% by weight of the total catalyst; and
   (d) impregnating the product of step (c) with rhodium in an amount no greater than 0.15% of the weight of the catalyst.

11. The method as in claim 10, in which palladium is impregnated by use of a diluted palladium nitrate solution with the amount of acid in such solution being regulated to a pH of 3-5 to provide incipient wetness, and after drying the wetted support with said acid, calcining the composite at a temperature in the range of 450°-650° C.

12. The method as in claim 10, in which the organo-titanium compound is dissolved in a liquid for wetting said composite, said wetted composite being calcined at a temperature of 400°-600° C. for 4-12 hours.

13. The method as in claim 12, in which said calcination is staged to include heating to 250°-280° C. for 1½ to 2½ hours, and thence heating to 400°-600° C. for 5-10 hours.

14. The method as in claim 10, in which said organo-titanium compound is titanium butoxide.

* * * * *